United States Patent
Kagan et al.

(10) Patent No.: US 8,949,486 B1
(45) Date of Patent: Feb. 3, 2015

(54) DIRECT MEMORY ACCESS TO STORAGE DEVICES

(71) Applicant: Mellanox Technologies Ltd., Yokneam (IL)

(72) Inventors: Michael Kagan, Zichron Yaakov (IL); Diego Crupnicoff, Buenos Aires (AR)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 13/943,809

(22) Filed: Jul. 17, 2013

(51) Int. Cl.
*G06F 13/28* (2006.01)

(52) U.S. Cl.
CPC .................................. *G06F 13/28* (2013.01)
USPC .............................................................. 710/22

(58) Field of Classification Search
CPC ....................................................... G06F 13/28
See application file for complete search history.

(56) References Cited

U.S. PATENT DOCUMENTS

| | | | | |
|---|---|---|---|---|
| 5,003,465 | A * | 3/1991 | Chisholm et al. | 710/25 |
| 5,768,612 | A * | 6/1998 | Nelson | 712/32 |
| 5,954,802 | A * | 9/1999 | Griffith | 710/22 |
| 6,701,405 | B1 * | 3/2004 | Adusumilli et al. | 710/308 |
| 7,225,277 | B2 * | 5/2007 | Johns et al. | 710/22 |
| 7,395,364 | B2 * | 7/2008 | Higuchi et al. | 710/305 |
| 7,577,773 | B1 * | 8/2009 | Gandhi et al. | 710/22 |
| 7,945,752 | B1 * | 5/2011 | Miller et al. | 711/162 |
| 8,255,475 | B2 | 8/2012 | Kagan et al. | |
| 8,260,980 | B2 * | 9/2012 | Weber et al. | 710/22 |
| 8,504,780 | B2 * | 8/2013 | Mine et al. | 711/147 |
| 2003/0120836 | A1 * | 6/2003 | Gordon | 710/22 |
| 2006/0259661 | A1 * | 11/2006 | Feng et al. | 710/39 |
| 2008/0005387 | A1 * | 1/2008 | Mutaguchi | 710/22 |
| 2008/0147904 | A1 * | 6/2008 | Freimuth et al. | 710/22 |
| 2008/0168479 | A1 * | 7/2008 | Purtell et al. | 719/328 |
| 2008/0313364 | A1 | 12/2008 | Flynn et al. | |
| 2010/0095053 | A1 * | 4/2010 | Bruce et al. | 711/103 |
| 2011/0213854 | A1 | 9/2011 | Haviv | |
| 2011/0246597 | A1 | 10/2011 | Swanson et al. | |
| 2014/0089631 | A1 * | 3/2014 | King | 711/207 |

OTHER PUBLICATIONS

Marks et al., "NVM Express: The Interface Standard for PCI Express SSDs", 18 pages, Flash Memory Summit, Santa Clara, USA, year 2011.

* cited by examiner

*Primary Examiner* — Henry Tsai
*Assistant Examiner* — Jing-Yih Shyu
(74) *Attorney, Agent, or Firm* — D. Kligler I.P. Services Ltd.

(57) ABSTRACT

An interface device includes a first proxy interface configured to carry out first direct memory access (DMA) transactions initiated by an input/output (I/O) device and a second proxy interface configured to carry out second DMA transactions initiated by a storage drive. A buffer memory is coupled between the first and second proxy interfaces and configured to temporarily hold data transferred in the first and second DMA transactions. Control logic is configured to invoke the second DMA transactions in response to the first DMA transactions so as to cause the data to be transferred via the buffer between the I/O device and the storage drive.

23 Claims, 1 Drawing Sheet

DIRECT MEMORY ACCESS TO STORAGE DEVICES

FIELD OF THE INVENTION

The present invention relates generally to computer systems, and particularly to interaction between computer peripheral devices.

BACKGROUND

Solid-state drives (SSDs) are mass-storage devices that use integrated circuit memory—typically NAND-based flash memory—to store data while providing an interface that emulates traditional hard disk drives (HDDs). By comparison with HDDs, SDDs offer faster access, lower latency, and greater resistance to environmental disturbances. Therefore, SDDs are gradually replacing HDDs in many storage applications.

Because SSDs were originally designed to take the place of HDDs, they have generally used the same sorts of input/output (I/O) buses and protocols as HDDs, such as SATA, SAS and Fibre Channel. More recently, however, SSDs have become available that connect directly to the peripheral component interface bus of a host computer, such as the PCI Express® (PCIe®) bus. For this purpose, the NVMe Work Group has developed the NVM Express specification (available on-line at nvmexpress.org), which defines a register interface, command set and feature set for PCI Express SSDs.

Advanced network interface controllers (NICs) are designed to support remote direct memory access (RDMA) operations, in which the NIC transfers data by direct memory access from the memory of one computer into that of another without involving the central processing unit (CPU) of the target computer. Although RDMA is generally used to transfer data to and from host memory (RAM), a number of attempts to adapt RDMA functionality for reading and writing data directly to and from an SSD have been described in the patent literature. For example, U.S. Patent Application Publication 2008/0313364 describes a method for remote direct memory access to a solid-state storage device, which is said to allow direct access between memory of a client connected through a network to such a device. Similarly U.S. Patent Application Publication 2011/0246597 describes a system in which a network interface component of a server may access a solid-state storage module of the server by a network storage access link that bypasses a central processing unit (CPU) and main memory of the server.

SUMMARY

Embodiments of the present invention provide apparatus and methods that support enhanced modes of interaction between I/O devices and storage drives.

There is therefore provided, in accordance with an embodiment of the present invention, an interface device, which includes a first proxy interface configured to carry out first direct memory access (DMA) transactions initiated by an input/output (I/O) device and a second proxy interface configured to carry out second DMA transactions initiated by a storage drive. A buffer memory is coupled between the first and second proxy interfaces and configured to temporarily hold data transferred in the first and second DMA transactions. Control logic is configured to invoke the second DMA transactions in response to the first DMA transactions so as to cause the data to be transferred via the buffer memory between the I/O device and the storage drive.

Typically, the first and second proxy interfaces are configured to carry out the DMA transactions as bus slaves in accordance with a peripheral component interface bus standard. In a disclosed embodiment, the first and second proxy interfaces are configured to carry out the DMA transactions by transmitting and receiving transaction layer packets.

Additionally or alternatively, at least one of the first and second proxy interfaces is configured to be connected to a peripheral component interface bus to which both the I/O device and the storage drive are configured to be coupled. In one embodiment, the first proxy interface is connected to the peripheral component interface bus, and the device includes multiplexing logic, which is coupled to the storage drive so as to convey the second DMA transactions between the storage drive and the second proxy interface and to convey third DMA transactions directly between the storage drive and the peripheral component interface bus. Typically, the control logic is configured to cause the data to be transferred between the I/O device and the storage drive without involvement of a central processing unit (CPU) and host memory that are connected to the peripheral component interface bus.

In some embodiments, the first proxy interface is configured to present an address space of the storage drive to the I/O device as though it was a range of random-access memory, while mapping the address space to the buffer memory.

In a disclosed embodiment, the control logic is configured to invoke the second DMA transactions by placing commands in a queue for execution by the storage drive and upon placing a command in the queue, to ring a doorbell of the storage drive and subsequently to receive a completion report from the storage drive upon completion of a corresponding second DMA transaction.

In some embodiments, the control logic is further configured to receive, via the second proxy interface, third DMA transactions initiated by the storage drive and to invoke, via the first proxy interface, in response to the third DMA transactions, fourth DMA transactions to be initiated by the I/O device.

In a disclosed embodiment, the storage drive is a solid-state drive (SSD), and the I/O device is a network interface controller (NIC). At least some of the first DMA transactions may be initiated responsively to remote direct memory access (RDMA) requests submitted to the NIC via a network.

There is also provided, in accordance with an embodiment of the present invention, an interface device, which includes at least one proxy interface, which is configured to be coupled to a peripheral component interface bus, to which a central processing unit (CPU), a host memory, and first and second input/output (I/O) devices are also coupled, and which is configured to carry out, over the bus, first direct memory access (DMA) transactions initiated by the first I/O device and second DMA transactions initiated by the second I/O device. A buffer memory is coupled to the at least one proxy interface and configured to temporarily hold data transferred in the first and second DMA transactions. Control logic is configured to invoke the second DMA transactions in response to the first DMA transactions so as to cause the data to be transferred via the buffer between the first and second I/O devices without involvement of the CPU and the host memory.

There is additionally provided, in accordance with an embodiment of the present invention, a method for data transfer, which includes coupling a first proxy interface to carry out first direct memory access (DMA) transactions initiated by an input/output (I/O) device and coupling a second proxy interface to carry out second DMA transactions initiated by a storage drive. The second DMA transactions are invoked in response to the first DMA transactions so as to cause data to be transferred between the I/O device and the storage drive via a bus of a host computer without passing through a main memory of the host computer.

The present invention will be more fully understood from the following detailed description of the embodiments thereof, taken together with the drawings in which:

DETAILED DESCRIPTION OF EMBODIMENTS

Figure 1:
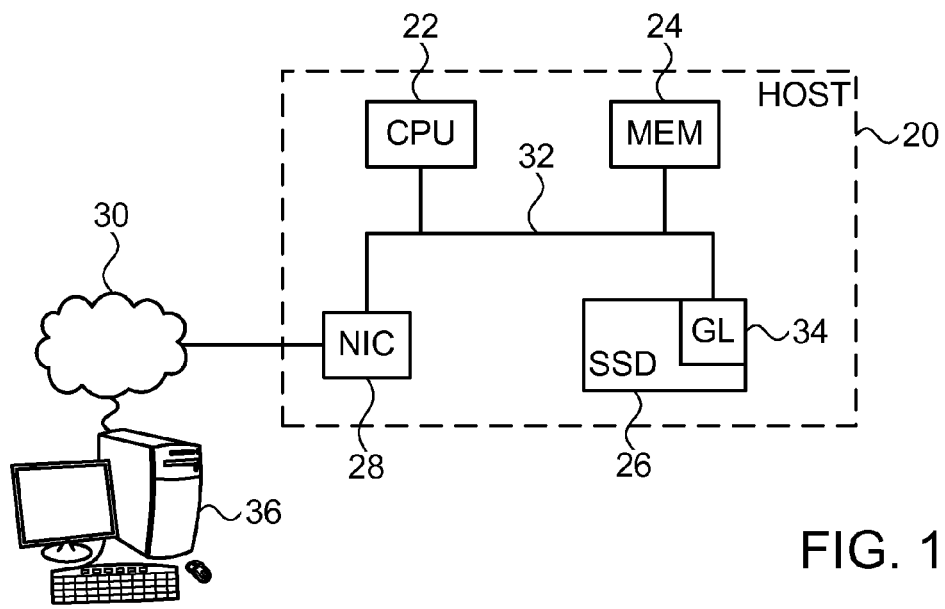
FIG. 1 is block diagram that schematically shows elements of a host computer, in accordance with an embodiment of the present invention.

Modern bus architectures and protocols, such as PCIe, allow multiple devices connected to the bus to act as bus masters, and thus initiate direct memory access (DMA) transactions to and from the host (main) memory. This scheme allows both NICs and SSDs, for example, to initiate DMA data transfers to and from the host memory. Since both the NIC and SSD are conventionally defined and configured as bus masters, however, they cannot transfer data directly via the bus from one to the other. Rather, such data must first be written to the memory by one of the bus master devices and then read from the memory by the other. This model introduces latency in data transfer and consumes bus and memory bandwidth, CPU cycles, and electrical power. Although it would be possible, for example, to design and produce an SSD that is configured as a bus slave, such an SSD would be a departure from the standard, mass-produced models that are currently available and would be incompatible with prevalent standards, such as NVMe.

Embodiments of the present invention that are described hereinbelow overcome these limitations by providing an interface device, which serves as "glue logic" between two bus masters—an input/output (I/O) device, such as a NIC, and a storage drive, such as an SSD—so as to enable the I/O device and the storage drive to exchange data over a bus by DMA without having to go through the host memory. This interface device enables a NIC, for example, to carry out RDMA operations directly to and from an SSD while still preserving the normal, bus-master functionality of the SSD. The embodiments described below relate specifically to this sort of NIC/SSD interaction, but the principles of the present invention may similarly be applied, mutatis mutandis, to I/O devices and storage drives of other types.

In the disclosed embodiments, the interface device comprises two proxy interfaces, both of which are configured to mimic the behavior of the host memory subsystem for the purposes of interacting with the I/O devices, one for receiving and executing DMA transactions initiated by the NIC, and the other for receiving and executing DMA transactions initiated by the SSD. A buffer memory, coupled between the proxy interfaces, temporarily holds the data that are transferred in the DMA transactions, between the time that these data are received via one of the proxy interfaces and the time that they are transferred out via the other. Control logic in the interface device invokes the DMA transactions by the SSD in response to the DMA transactions received from the NIC, typically by submitting a suitable DMA request or command (such as an NVMe command) to the storage drive via the corresponding proxy interface. As a result, data uploaded to the interface device by the NIC will be transferred through the buffer with minimal latency to the storage drive, and likewise data downloaded from the storage drive to the NIC.

Typically, for compatibility with existing host buses and peripheral devices, the proxy interfaces of the interface device are configured to carry out the DMA transactions in accordance with a peripheral component interface bus standard, such as the PCIe specification, whereby the DMA transactions are carried out by transmitting and receiving transaction layer packets. In general, one of the proxy interfaces is actually connected to the bus and thus receives transactions over the bus, while the other proxy interface is connected directly to the peripheral device (NIC or SSD) that it serves.

In a typical embodiment, the proxy interface for the NIC is connected to the bus, and the interface device comprises multiplexing logic, which is coupled at one side to the SSD controller and at the other side to the proxy interface of the interface device that serves the SSD. The other multiplex connection of the multiplexing logic connects to the bus, in order to convey DMA transactions directly between the SSD and the bus. The multiplexing logic thus enables the same SSD both to receive DMA transactions from the NIC as though it were a bus slave and to perform other DMA transactions to and from the host memory as a bus master.

The SSD controller may implement a command interface, such as the NVMe interface, by which clients (such as host applications) invoke DMA transactions by placing commands in a queue for execution by the SSD. In a disclosed embodiment, the control logic of the interface device uses this command interface to invoke the DMA transactions between the SSD and the slave interface that are required in order to carry out the DMA operations initiated by the NIC, as explained above. The control logic in this case places an appropriate command in the queue of the SSD controller, then "rings a doorbell" (i.e., writes to a doorbell register) of the SSD to indicate that the command has been queued, and finally may receive a completion report from the SSD upon completion of the corresponding DMA transaction.

FIG. 1 is block diagram that schematically shows elements of a host computer 20 that is configured in the manner described above, in accordance with an embodiment of the present invention. Computer 20 comprises a CPU 22 with a host memory 24, along with a storage drive, which is assumed in this embodiment to be an SSD 26. A NIC 28 connects computer 20 to a network 30, typically a packet network such as an Ethernet or InfiniBand™ network, and thus handles data transfer to and from other network nodes, such as a peer computer 36 that is shown in the figure. The elements of host computer 20 communicate with one another to exchange data and commands via a peripheral component interface bus 32, such as a PCIe bus. Typically, these communications are carried out by corresponding bus transactions, in which transaction layer packets are transmitted and received over bus 32.

Client processes running on CPU 22 typically invoke operations of SSD 26 and NIC 28 by placing commands (sometimes referred to as "work items") in a command queue of the SSD or NIC, and then notifying the SSD or NIC that a command is awaiting execution. Assuming NIC is an InfiniBand-compatible host channel adapter (HCA), for example, the commands are referred to as work queue elements, and client processes write the commands to assigned work queues in host memory 24. (Similar functionality is available in advanced NICs for Ethernet, Fibre Channel, and other network standards, although different vocabularies may be used in referring to the hardware and data elements involved.) After writing a work item to a work queue, the client process "rings the doorbell" of the NIC by writing to a specified doorbell register in the NIC, which has a predefined address on bus 32. Typically, the data word written to the register by the client process identifies the work queue to which the command has been written.

Ringing the doorbell causes NIC 28 to read the work items in turn from the corresponding work queues in host memory 24 and then execute them by initiating appropriate transactions on bus 32. For example, a work item may cause NIC 28 to carry out an RDMA operation to read data from the memory of computer 36 and write the data to host memory 24. Alternatively, in the present embodiment, such an RDMA operation may be carried out by NIC directly to or from SSD 26, without passing the data through host memory 24, as explained further hereinbelow. Upon completion of the requested operation, the NIC typically writes a completion report, referred to as a completion queue element, to another queue in host memory 24, where the report can be read by the corresponding client process.

The operation of SSD 26 vis-à-vis client processes may follow a similar model. For example, client processes on CPU 22 may invoke operations of an NVMe-compatible SSD by writing to a command queue in memory and ringing a doorbell of the SSD. The SSD will then initiate DMA transactions on bus 32 to transfer data from host memory 24 to SSD 26 or from the SSD to the memory, and may submit a completion report when a transaction has been completed.

To enable direct data transfer over bus 32 by DMA between NIC 28 and SSD 26, the SSD includes an interface device 34, also referred to herein as "glue logic" (GL). Interface device 34 is capable of carrying out such DMA operations from the NIC to the SSD and from the SSD to the NIC without involvement of CPU 22 and host memory 24, so that the data in question do not pass through host memory 24, even temporarily, in the course of the operations. The design and operation of interface device 34 are explained in detail hereinbelow with reference to FIG. 2. Interface device 34 may comprise a single integrated circuit chip, which may be incorporated as an add-on component in or alongside a standard, off-the-shelf SSD and serve as the interface between the SSD and bus 32. In alternative embodiments (not shown in the figures), interface device 34 may be incorporated in or alongside NIC 28 or as a standalone component, connected to SSD 26 and/or NIC 28 by a suitable bus (which may be bus 32).

Figure 2:
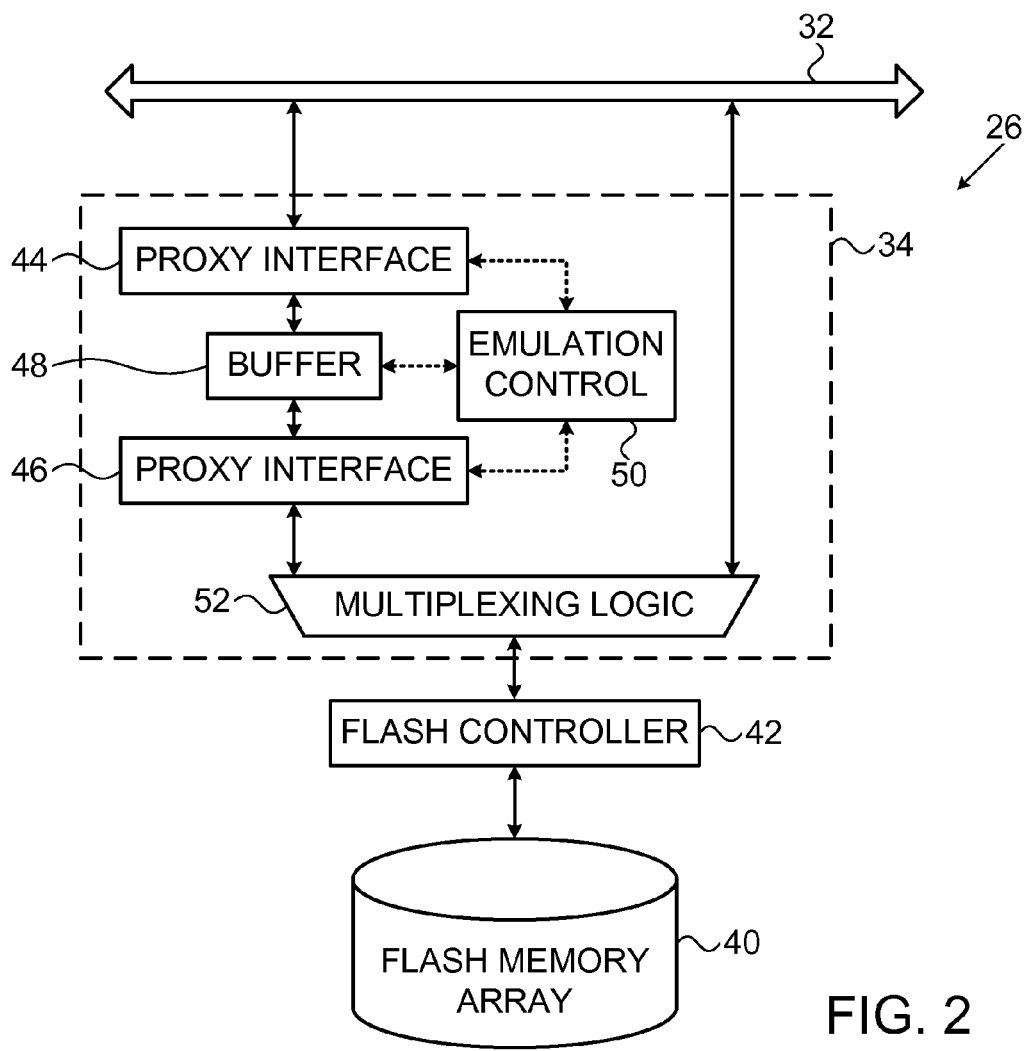
FIG. 2 is a block diagram that schematically illustrates an SSD with an interface device in accordance with an embodiment of the present invention.

FIG. 2 is a block diagram that schematically shows details of SSD 26 with interface device 34, in accordance with an embodiment of the present invention. The conventional components of SSD 26 include a flash memory array 40 and a flash controller 42, which handles data access to and from flash memory array 40. As explained earlier, flash controller 42 is configured to operate generally as a bus master on bus 32 (although it also has slave capability for other accesses, such as receiving doorbells, for example), in accordance with the NVMe specification, for example. SSDs comprising a flash memory array and controller of this sort are widely available commercially, from a variety of vendors, and further details of flash memory array 40 and flash controller 42 are therefore omitted here for the sake of simplicity.

Interface device 34 has two proxy interfaces 44 and 46, which emulate the sort of bus slave interface that host memory 24 presents to bus 32. Proxy interface 44 presents the address space of all or part of flash memory array 40 as though it was a large physical range of random-access memory (RAM) in host memory 24. This large range of memory may be divided up for allocation to different work queues that are served by NIC 28. The NIC may thus address DMA operations (such as RDMA read and write operations) to addresses in flash memory array 40 by directing DMA transactions over bus 32 to proxy interface 44, and client processes running on CPU 22 may submit data transfer commands to their assigned work queues that specify such addresses for service by the NIC. By the same token, proxy interface 46 presents a certain address range to flash controller 42 as though this range was a part of host memory 24. To avoid data transfer bottlenecks in interface device 34, proxy interfaces 44 and 46 are typically both designed to have the same bandwidth, which may be at least equal to the bandwidth of bus 32 in order to support wire-speed transfers between NIC 28 and SSD 26.

Proxy interfaces 44 and 46 map the address ranges that they present to addresses in a buffer memory 48, which holds data temporarily as the data are transferred between the proxy interfaces on the way to or from flash memory array 40. Typically, buffer memory 48 comprises a small amount of RAM, sufficient to compensate for the time it takes to complete the outstanding data transfer operation from proxy interface 46 to flash memory array (which is comparable to the time required for similar write operations from bus 32 to flash memory array 40). Proxy interfaces 44 and 46 may use virtual addressing in buffer memory 48, since the range of physical memory presented by proxy interface 44 to NIC 28 is much larger than the actual size of the buffer memory itself.

An emulation controller 50 coordinates the operation of proxy interfaces 44 and 46, by causing the proxy interfaces to concurrently execute back-to-back DMA operations between NIC 28 and buffer memory 48 and between buffer memory 48 and flash memory array 40. For example, upon receiving a transaction layer packet from bus 32 indicating that NIC 28 has initiated a DMA write transaction to an address in the range presented by proxy interface 44, the proxy interface notifies emulation controller 50. In response to this notification, emulation controller 50 writes a "disk write" command to buffer memory 48 and rings the doorbell of flash controller 42 by writing to the appropriate register of flash controller 42 via proxy interface 46. Flash controller 42 responds to the doorbell by reading the command from buffer memory 48, which causes the flash controller to perform a DMA read command and to prompt proxy interface 46 to begin transmitting data. Thus, as NIC 28 begins sending the DMA data over bus 32, proxy interface 44 receives and transfers the data via buffer 48 to proxy interface 46, which writes the data via flash controller 42 to flash memory array 40. When all data have been transferred, flash controller 42 writes a completion report via proxy interface 46 to buffer 48.

The above transaction model may lead to accumulation of data in buffer 48 (and possible overflow of the buffer) if flash controller 42 is not ready to receive the data when NIC 28 begins transmitting. This problem may be mitigated by enlarging the buffer. Additionally or alternatively, the NIC may use a page fault mechanism to delay data transfer until the flash controller is ready to receive the data. Advanced NICs that are known in the art incorporate translation tables with virtual addressing and page fault handling capabilities, as described, for example, in U.S. Pat. No. 8,255,475, whose disclosure is incorporated herein by reference. The translation tables in NIC 28 may be configured, for example, so that every attempt to write to the address range that is mapped to interface device 34 will result in a page fault exception. The NIC will then wait to start sending data over bus 32 to interface device 34 until the interface device has returned a notification to the NIC that it has a page available.

DMA transactions initiated by NIC 28 to read data from addresses in SSD 26 are carried out in similar fashion (although without the potential buffer overflow issues explained above). In both read and write transactions, the operation of interface device 34 is typically transparent to the NIC and the SSD, so that standard NICs and storage devices can interact in the fashion described above without substantial modification to their hardware and software, other than addition of interface device 34 between them.

Furthermore, as shown in FIG. 2, interface device 34 may be designed to permit SSD 26 to continue operating as a master on bus 32. The SSD is thus able to perform DMA data transfers to and from host memory 24, for example, notwithstanding its operation as a slave to NIC 28. For this purpose, interface device 34 may optionally comprise multiplexing logic 52, interposed between flash controller 42 and proxy interface 46, with an additional connection to bus 32. When multiplexing logic 52 receives transaction layer packets transmitted by flash controller 42 with destination addresses in the range assigned to proxy interface 46, the multiplexing logic passes these packets to the proxy interface, while passing transaction layer packets with other destination addresses to bus 32. Consequently, flash controller 42 is able to initiate DMA operations on bus 32, to and from host memory 24, for example, just as it could in the absence of interface device 34.

Furthermore, although the examples presented above relate to execution of DMA operations that are initiated by NIC 28, interface device 34 may, additionally or alternatively, be configured to support execution of DMA operations initiated by SSD 26. In such a scenario, interface device 34 may map, vis-à-vis flash controller 42, a range of addresses corresponding to NIC 28. When suitable software running on CPU 22 sends a command to SSD 26 to write or read data to or from this mapped memory range, flash controller 42 will submit a DMA transaction to proxy interface 46. Upon receiving this transaction, emulation controller 50 will invoke a corresponding DMA transaction to be performed by NIC 28 via proxy interface 44, and data transfer will then proceed as described above.

Typically, the components of interface device 34, including proxy interfaces 44 and 46, emulation controller 50, and multiplexing logic 52, are implemented by suitable logic circuits, which may be hard-wired or programmable. Alternatively, at least some of the functions of these components may be carried out by a programmable processor, such as a microcontroller with suitable software or firmware. (For simplicity, the term "control logic" is used in the present description and in the claims to refer to the functions of emulation controller 50 and, optionally, multiplexing logic 52, as well.) As noted earlier, the components of interface device 34 may all be embodied in a single integrated circuit (IC) chip, possibly together with buffer memory 48, as well. Alternatively, the functions of the interface device may be distributed among multiple, separate IC components. Some or all of these functions and components of the interface device may, as noted earlier, be embedded in the SSD and/or the NIC; or the interface device may be deployed as a standalone device.

In an alternative implementation (not shown in the figures), interface device 34 may have only a single proxy interface, which is connected on one side to bus 32 and on the other to buffer 48 and emulation controller 50. The proxy interface in this case communicates over bus 32 with NIC 28 and flash controller 42 in turn in order to invoke and carry out the DMA operations that are explained above. There is no need in this case for multiplexer 52, since the interface device, the NIC, and the flash controller are all directly connected to bus 32. This model may be less efficient, in terms of bus bandwidth, than the dual-interface device described earlier, but it has the advantage of being easy to retrofit to existing systems, while still enabling transfer of data between the NIC and the SSD without involvement of CPU 22 and host memory 24.

As noted earlier, although the embodiments described above relate specifically to DMA data transfers between NIC 28 and SSD 26, the principles of the present invention may similarly be applied to enable such data transfers to be carried out by and between other types of I/O peripheral devices as well, and involving substantially any suitable type of storage drive, including magnetic and optical drives, for instance. As one example of such alternative embodiments, a suitable interface device with the sort of capabilities that are described above could be applied to enable DMA data transfer from an imaging device (such as a camera or medical imaging system) to a NIC for transmission over a network, or to a storage drive.

As another example, an interface device may be used to enable DMA data transfers between two NICs. This latter embodiment could be used to implement a data relay service (with functionality of a firewall, router, and/or switch) using off-the-shelf NICs. Data transfers pass directly between the NICs, without involving the host CPU and its memory, unless there is some sort of exception that requires higher level processing, in which case the data transfer is diverted to a slower path that does involve the CPU.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An interface device, comprising:
   a first proxy interface configured to carry out first direct memory access (DMA) transactions initiated by an input/output (I/O) device;
   a second proxy interface configured to carry out second DMA transactions initiated by a storage drive,
   wherein the first and second proxy interfaces are configured to carry out the DMA transactions as bus slaves in accordance with a peripheral component interface bus standard, and
   wherein at least one of the first and second proxy interfaces is configured to be connected to a peripheral component interface bus to which both the I/O device and the storage drive are configured to be coupled;
   a buffer memory, coupled between the first and second proxy interfaces and configured to temporarily hold data transferred in the first and second DMA transactions; and
   control logic, configured to invoke the second DMA transactions in response to the first DMA transactions so as to cause the data to be transferred via the buffer memory between the I/O device and the storage drive,
   wherein the control logic is configured to cause the data to be transferred between the I/O device and the storage drive without involvement of a central processing unit (CPU) and host memory that are connected to the peripheral component interface bus.

2. The device according to claim 1, wherein the first and second proxy interfaces are configured to carry out the DMA transactions by transmitting and receiving transaction layer packets.

3. The device according to claim 1, wherein the first proxy interface is connected to the peripheral component interface bus, and wherein the device comprises multiplexing logic, which is coupled to the storage drive so as to convey the second DMA transactions between the storage drive and the second proxy interface and to convey third DMA transactions directly between the storage drive and the peripheral component interface bus.

4. The device according to claim 1, wherein the first proxy interface is configured to present an address space of the storage drive to the I/O device as though it was a range of random-access memory, while mapping the address space to the buffer memory.

5. The device according to claim 1, wherein the control logic is configured to invoke the second DMA transactions by placing commands in a queue for execution by the storage drive.

6. The device according to claim 5, wherein the control logic is configured, upon placing a command in the queue, to ring a doorbell of the storage drive and subsequently to receive a completion report from the storage drive upon completion of a corresponding second DMA transaction.

7. The device according to claim 1, wherein the control logic is further configured to receive, via the second proxy interface, third DMA transactions initiated by the storage drive and to invoke, via the first proxy interface, in response to the third DMA transactions, fourth DMA transactions to be initiated by the I/O device.

8. The device according to claim 1, wherein the storage drive is a solid-state drive (SSD).

9. The device according to claim 1, wherein the I/O device is a network interface controller (NIC).

10. The device according to claim 9, wherein at least some of the first DMA transactions are initiated responsively to remote direct memory access (RDMA) requests submitted to the NIC via a network.

11. An interface device, comprising:
  at least one proxy interface, which is configured to be coupled to a peripheral component interface bus, to which a central processing unit (CPU), a host memory, and first and second input/output (I/O) devices are also coupled, and which is configured to carry out, over the bus, first direct memory access (DMA) transactions initiated by the first I/O device and second DMA transactions initiated by the second I/O device as a bus slave in accordance with a peripheral component interface bus standard;
  a buffer memory, coupled to the at least one proxy interface and configured to temporarily hold data transferred in the first and second DMA transactions; and
  control logic, configured to invoke the second DMA transactions in response to the first DMA transactions so as to cause the data to be transferred via the buffer memory between the first and second I/O devices without involvement of the CPU and the host memory.

12. The device according to claim 11, wherein the at least one proxy interface is configured to present an address space of the second I/O device to the first I/O device as though it was a range of random-access memory, while mapping the address space to the buffer memory.

13. The device according to claim 11, wherein at least the first I/O device is a network interface controller (NIC).

14. A method for data transfer, comprising:
  coupling a first proxy interface to carry out first direct memory access (DMA) transactions initiated by an input/output (I/O) device;
  coupling a second proxy interface to carry out second DMA transactions initiated by a storage drive,
  wherein the first and second proxy interfaces are configured to carry out the DMA transactions as bus slaves in accordance with a peripheral component interface bus standard;
  coupling at least one of the first and second proxy interfaces to a peripheral component interface bus to which both the I/O device and the storage drive are coupled;
  invoking the second DMA transactions in response to the first DMA transactions so as to cause data to be transferred between the I/O device and the storage drive via a bus of a host computer without passing through a main memory of the host computer and without involvement of a central processing unit (CPU) and the main memory of the host computer, which are connected to the peripheral component interface bus.

15. The method according to claim 14, wherein invoking the second DMA transactions comprises transferring the data via a buffer memory, which is coupled between the first and second proxy interfaces and is separate from the main memory.

16. The method according to claim 15, wherein coupling the first proxy interface comprises presenting, via the first proxy interface, an address space of the storage drive to the I/O device as though it was a range of random-access memory, while mapping the address space to the buffer memory.

17. The method according to claim 14, wherein the first and second proxy interfaces are configured to carry out the DMA transactions by transmitting and receiving transaction layer packets.

18. The method according to claim 14, wherein coupling the at least one of the first and second proxy interfaces comprises connecting the first proxy interface to the peripheral component bus, and wherein conveying the second DMA transactions between the storage drive and the second proxy interface and conveying third DMA transactions directly between the storage drive and the peripheral component bus.

19. The method according to claim 14, wherein invoking the second DMA transactions comprises placing commands in a queue for execution by the storage drive.

20. The method according to claim 19, wherein invoking the second DMA transactions comprises, upon placing a command in the queue, ringing a doorbell of the storage drive and subsequently receiving a completion report from the storage drive upon completion of a corresponding second DMA transaction.

21. The method according to claim 14, and comprising receiving, via the second proxy interface, third DMA transactions initiated by the storage drive and invoking, via the first proxy interface, in response to the third DMA transactions, fourth DMA transactions to be initiated by the I/O device.

22. The method according to claim 14, wherein the storage drive is a solid-state drive (SSD), and the I/O device is a network interface controller (NIC).

23. The method according to claim 22, wherein at least some of the first DMA transactions are initiated responsively to remote direct memory access (RDMA) requests submitted to the NIC via a network.

* * * * *